May 7, 1968

A. BRKICH 3,382,018

LIQUID RESISTANT HOUSING VENT

Filed Aug. 10, 1965

INVENTOR.
ALEXANDER BRKICH

United States Patent Office 3,382,018
Patented May 7, 1968

3,382,018
LIQUID RESISTANT HOUSING VENT
Alexander Brkich, Phillipsburg, N.J., assignor to Ingersoll-Rand Company, New York, N.Y., a corporation of New Jersey
Filed Aug. 10, 1965, Ser. No. 478,683
5 Claims. (Cl. 308—245)

ABSTRACT OF THE DISCLOSURE

A liquid resistant vent for a bearing housing, comprising first port means communicating with the interior of the bearing housing, second port means vertically below the first port means and communicating with the atmosphere, and passage means connecting the port means, wherein the first and second port means constitute the only communication of the passage means with the interior of the bearing housing and with the atmosphere, respectively.

Figure 1:
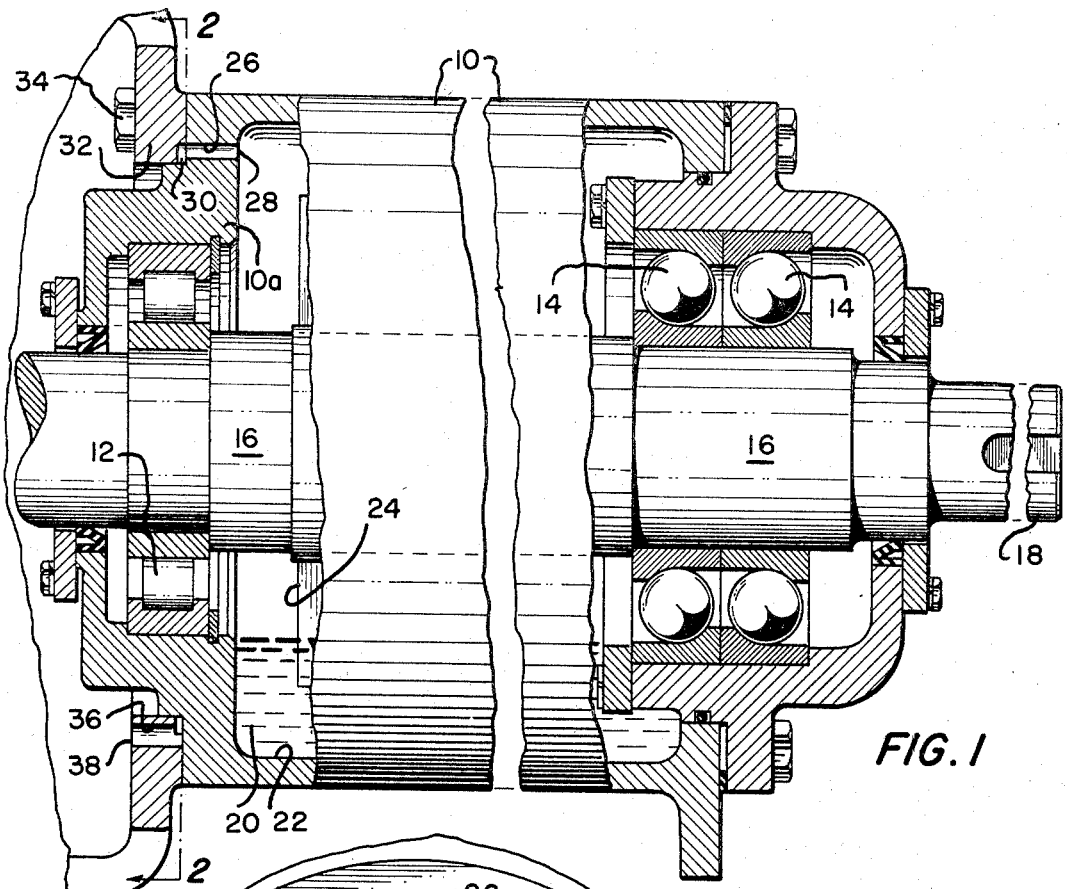

This invention relates to vent apparatus for equalizing the pressure within a housing with the pressure externally around the housing and more particularly to the provision of a new and improved housing vent which is liquid resistant even when directly exposed to an external flow of pressurized liquid.

A bearing housing or the like is vented to atmosphere to prevent pressure or vacuum build up which might induce lubricant leakage from the housing or moisture entry thereinto. Conventionally, this venting of the bearing housing is accomplished by means of a drilled plug or more complex structure which directly communicates the housing above the level of the lubricant to atmosphere.

In many applications of a bearing housing, and particularly in its employment in a chemical or paper stock pump, the housing is necessarily directly exposed to an external flow of pressurized liquid for cleaning purposes. It has been found that conventional housing vents, when subjected to such a pressurized liquid flow, are unsatisfactory in that they fail to exclude the liquid flow from the interior of the bearing housing.

An object of the present invention is to provide a new and improved housing vent for a bearing housing, which is constructed and arranged to be liquid resistant even when directly exposed to an external flow of pressurized liquid such as is employed for the purposes of cleaning chemical and paper stock pumps.

Another object is to provide a new and improved housing vent of the type set forth which, while being highly efficient in resisting liquid entry into the housing, is extremely economical in construction.

Other objects and advantages of the invention will be apparent from the following description taken in connection with the accompanying drawings. It will be understood that changes may be made in the details of construction and arrangement of parts shown and described as the preferred form of the invention has been given by way of illustration only.

Figure 2:
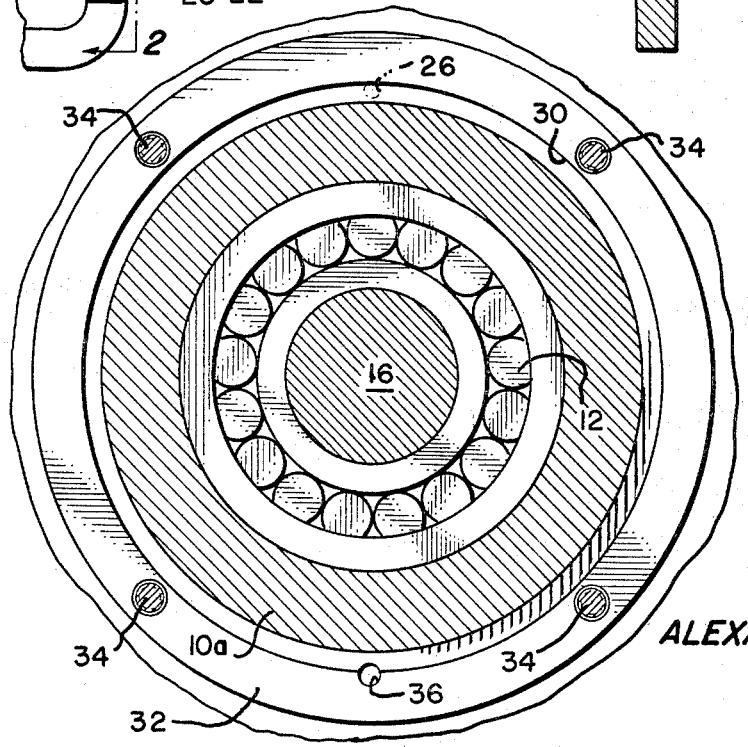

Referring to the drawings:

FIG. 1 is an elevational view in section of a bearing housing including a housing vent constructed in accordance with the present invention; and FIG. 2 is a sectional view through the housing vent of the bearing housing shown in FIG. 1, taken on line 2—2 of FIG. 1, looking in the direction of the arrows.

Referring more particularly to the drawings wherein similar reference characters designate corresponding parts throughout the several views, FIG. 1 illustrates a horizontally disposed bearing housing designated generally at 10 which supports a radial roller bearing 12 in axial alignment with a plurality of ball thrust bearings 14. The roller bearing 12 and the ball bearings 14 cooperate to rotatably support a horizontal disposed shaft 16 which is the driving shaft of a rotary pump of the type employed in chemical and paper stock applications. The rotatable shaft 16 is adapted to be operatively connected adjacent an end 18 to a suitable source of rotary power (not shown) and carries an impeller (not shown) adjacent its opposing longitudinal end. A suitable bearing lubricant 20 is disposed within the cavity 22 of the bearing housing 10 and is supplied to the roller bearing 12 and the ball bearings 14 during the rotation of the rotatable shaft 16 by a lubricant flinger 24 carried by the rotatable shaft 16.

The bearing housing 10 is provided with a new and improved liquid resistant housing vent constructed in accordance with the present invention for equalizing the pressure within the cavity 22 with that externally around the bearing housing 10. More specifically, the housing vent comprises a substantially horizontal fluid passage 26 formed through the body portion 10a of the bearing housing 10 adjacent the vertically upper surface thereof. The fluid passage 26 communicates with the cavity 22 through a port means formed by a first port 28 and connects the cavity 22 with a substantially vertically extending, annular fluid passage 30 formed in a flange 32 carried by the body 10a of the bearing housing 10. The fluid passage 26 and the port 28, as shown in FIG. 2, constitute the only communication between the cavity 22 and the annular fluid passage 30. The flange 32 is secured to the body 10a by a plurality of bolts or similar headed fasteners 34 to form a liquid tight seal between the flange 32 and the body 10a. In order to insure that liquid may not enter between the flange 32 and the body 10a, a suitable gasket (not shown) could be inserted therebetween.

The annular fluid passage 30 communicates with a substantially horizontal fluid passage 36 formed through the flange 32 adjacent the vertically lower surface of the bearing housing 10. The fluid passage 36, in turn, communicates through a port means formed by a second port 38 with the atmosphere externally around the bearing housing 10 to connect the cavity 22 with the atmosphere. The fluid passage 36 and the port 38, as shown in FIG. 2, constitute the only communication between the annular fluid passage 30 and the atmosphere.

From the foregoing, it will be seen that the housing vent provided by the present invention comprises, in brief, a first port 28 communicating with the cavity 22 within the bearing housing 10, a second port 38 vertically below the first port 28 and communicating with the atmosphere externally around the bearing housing 10, and fluid passage means communicating the first port 28 with the second port 38. It will also be seen that, although this housing vent will effectively equalize the pressure within the cavity 22 with that externally around the bearing housing 10, the vertical displacement of the first port 28 above the second port 38 will prevent liquid from entering the cavity 22 even when the second port 38 is directly exposed to an external pressurized liquid flow.

Thus, it will be seen that I have provided a new and improved housing vent which is liquid resistant even when directly exposed to an external flow of pressurized liquid such as is employed for the purposes of cleaning chemical and paper stock pumps. It will also be seen that this new and improved housing vent which I have provided, while being highly efficient in resisting liquid entry, is extremely economical in construction.

From the foregoing, it will be seen that I have provided new and improved means for accomplishing all of the objects and advantages of my invention.

Having thus described my invention, I claim:

1. In combination, a shaft, a housing containing bearing means rotatably mounting said shaft, and a liquid resistant vent for said housing, said vent comprising said housing being provided with a generally vertical, annular vent passage closed from said shaft, first passage means connected to said vent passage and communicating through first port means with the interior of said housing, and second passage means connected to said vent passage below said connection of said first passage means thereto and communicating through second port means with the atmosphere external to said housing, said first and second passage means being the only communication of said vent passage with the interior of said housing and with the atmosphere, respectively.

2. The combination of claim 1, further comprising said first passage means being connected to said vent passage adjacent the upper extremity of said vent passage, and said second passage means being connected to said vent passage adjacent the lower extremity thereof.

3. The combination of claim 2, further comprising said first and second port means being located on opposing sides of said vent passage whereby said first and second passage means project from said vent passage towards opposing sides thereof.

4. The combination of claim 3, further comprising said passage means each including only a single passage, and said port means each comprising only a single port.

5. The combination of claim 3, further comprising said passage means each including only a single, generally horizontally extending passage and being arranged to communicate with said vent passage through single ports located substantially 180 degrees apart.

References Cited

UNITED STATES PATENTS

| | | | |
|---|---|---|---|
| 1,066,276 | 7/1913 | Hockensmith | 308—187.1 X |
| 1,691,303 | 11/1928 | Porter | 308—187 X |
| 1,927,511 | 9/1933 | Wood | 308—187 |
| 2,045,026 | 6/1936 | Rosendahl | 308—187 X |
| 2,630,793 | 3/1953 | Best | 123—196 |
| 3,308,681 | 3/1967 | Huber | 181—1 X |
| 1,419,982 | 6/1922 | Reedy | 308—187 |
| 1,734,566 | 11/1929 | Drumm | 220—44 |
| 2,017,290 | 10/1935 | Parker | 308—187 |
| 2,179,321 | 11/1939 | Brown | 308—187 |
| 2,386,639 | 10/1945 | Stafford | 308—187 X |
| 2,501,621 | 3/1950 | Smith | 220—44 |
| 2,937,059 | 5/1960 | Anderson | 308—187 |
| 2,986,433 | 5/1961 | Herrmann | 308—187 |

MARTIN P. SCHWADRON, *Primary Examiner.*

L. L. JOHNSON, *Assistant Examiner.*